(12) United States Patent
Nakahara

(10) Patent No.: US 11,016,266 B2
(45) Date of Patent: May 25, 2021

(54) OCULAR OPTICAL SYSTEM, AND OBSERVATION APPARATUS AND IMAGING APPARATUS INCLUDING THE SAME

(71) Applicant: CANON KABUSHIKI KAISHA, Tokyo (JP)

(72) Inventor: Seiji Nakahara, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 43 days.

(21) Appl. No.: 15/952,069

(22) Filed: Apr. 12, 2018

(65) Prior Publication Data

US 2018/0314035 A1 Nov. 1, 2018

(30) Foreign Application Priority Data

Apr. 28, 2017 (JP) .............................. JP2017-090590

(51) Int. Cl.
| | |
|---|---|
| *G02B 9/34* | (2006.01) |
| *G02B 1/04* | (2006.01) |
| *G02B 3/02* | (2006.01) |
| *H04N 5/232* | (2006.01) |
| *H04N 5/225* | (2006.01) |
| *G02B 25/00* | (2006.01) |

(52) U.S. Cl.
CPC .............. *G02B 9/34* (2013.01); *G02B 1/041* (2013.01); *G02B 3/02* (2013.01); *G02B 25/001* (2013.01); *H04N 5/2254* (2013.01); *H04N 5/23293* (2013.01)

(58) Field of Classification Search
CPC .......... G02B 9/34; G02B 25/001; G02B 1/04; G02B 1/041; G02B 15/177; G02B 3/02; G02B 13/02; G02B 13/18; G02B 13/004; H04N 5/225; H04N 5/2254; H04N 5/232; H04N 5/23293

USPC ....... 359/643, 644, 660, 715, 747, 772, 771, 359/774, 682

See application file for complete search history.

(56) References Cited

U.S. PATENT DOCUMENTS

| | | | | |
|---|---|---|---|---|
| 6,011,655 A | * | 1/2000 | Kanai | G02B 25/001 |
| | | | | 359/643 |
| 6,414,798 B1 | * | 7/2002 | Koizumi | G02B 25/001 |
| | | | | 359/643 |
| 2012/0127595 A1 | | 5/2012 | Matsuo | |
| 2015/0103411 A1 | | 4/2015 | Katagata | |
| 2015/0205091 A1 | | 7/2015 | Matsuo et al. | |
| 2015/0212289 A1 | | 7/2015 | Matsuo | |
| 2015/0362720 A1 | | 12/2015 | Saito | |

FOREIGN PATENT DOCUMENTS

| | | |
|---|---|---|
| JP | 2016224238 A | 12/2016 |
| JP | 2016224239 A | 12/2016 |
| JP | 2017068129 A | 4/2017 |

* cited by examiner

*Primary Examiner* — Jie Lei

(74) *Attorney, Agent, or Firm* — Canon U.S.A., Inc. IP Division

(57) ABSTRACT

In an ocular optical system including a first lens having positive refractive power, a second lens having negative refractive power, a third lens having positive refractive power, and a fourth lens having positive refractive power which are arranged in this order from an object side to an observation side, the shape and position of each lens is set appropriately to increase the angle of view and to minimize on-axis and magnification chromatic aberrations.

12 Claims, 11 Drawing Sheets

OCULAR OPTICAL SYSTEM, AND OBSERVATION APPARATUS AND IMAGING APPARATUS INCLUDING THE SAME

BACKGROUND OF THE INVENTION

Field of the Invention

The present disclosure relates to an ocular optical system and an observation apparatus and an imaging apparatus including the same, for example, those that are suitable for observing images displayed on an image display device of an electronic viewfinder for use in video cameras, still cameras, and broadcast cameras.

Description of Related Art

Conventional electronic viewfinders for use in optical apparatuses, such as video cameras and broadcast cameras, are provided with an ocular optical system for observing images displayed on an image display surface provided inside such cameras.

In recent years, imaging apparatuses have become increasingly sophisticated, and there have been demands for electronic viewfinders which have a wide field of view and that are capable of displaying an image in a large size. Methods for realizing such demands include a method of enlarging an image display surface, such as increasing the size of a liquid crystal display arranged inside the camera, and/or a method of increasing the observation magnification of the ocular optical system used to observe the image displayed in the image display surface.

Enlarging an image display surface leads to an increase in the viewfinder size. Therefore, in order to reduce the size of an entire viewfinder, it is desirable to increase the observation magnification of the ocular optical system. To increase the observation magnification of an ocular optical system, the positive refractive power of the ocular optical system needs to be increased. However, on-axis chromatic aberration and magnification chromatic aberration occur frequently in an ocular optical system consisting only of a positive lens, and it is difficult to correct such aberrations. Thus, an ocular optical system desirably includes a negative lens in addition to a positive lens in order to acquire highly-precise observation images while increasing the observation magnification of the ocular optical system. In this way, observation images are acquired with reduced on-axis chromatic aberrations and magnification chromatic aberrations.

United States Patent Application Publication No. 2015/0103411 discusses an eyepiece optical system including a first lens having positive refractive power, a second lens having negative refractive power, a third lens having positive refractive power, and a fourth lens having positive refractive power which are arranged in this order from an object side to an observation side. The refractive power of each of the two positive lenses arranged on the observation side is set as appropriate to increase the observation magnification and enlarge the angle of view.

SUMMARY OF THE INVENTION

According to an aspect of the present disclosure, an ocular optical system includes a first lens having positive refractive power, a second lens having negative refractive power, a third lens having positive refractive power, and a fourth lens having positive refractive power, the first, second, third, and fourth lenses arranged in this order from the object side to an observation side, wherein conditional expressions $1.00 < (R31+R22)/(R31-R22) < 4.50$, $1.00 < (R41+R32)/(R41-R32) < 4.50$, $-0.80 < (R12+R11)/(R12-R11) < -0.40$ and $5.00 < vd2 < 23.00$ are satisfied, where R22 is a curvature radius of an observation-side lens surface of the second lens, R31 is a curvature radius of an object-side lens surface of the third lens, R32 is a curvature radius of an observation-side lens surface of the third lens, and R41 is a curvature radius of an object-side lens surface of the fourth lens, R11 is a curvature radius of an object-side lens surface of the first lens, and R12 is a curvature radius of an observation-side lens surface of the first lens, vd2 is an Abbe number of a material of the second lens.

Further features of the present disclosure will become apparent from the following description of exemplary embodiments with reference to the attached drawings.

DESCRIPTION OF THE EMBODIMENTS

An ocular optical system according to an exemplary embodiment of the present disclosure and an observation apparatus and an imaging apparatus including the ocular optical system will be described in detail below with reference to the attached drawings. The ocular optical system according to each exemplary embodiment includes a first lens L1 having positive refractive power, a second lens L2 having negative refractive power, a third lens L3 having positive refractive power, and a fourth lens L4 having positive refractive power, and the first to fourth lenses L1 to L4 are arranged in this order from an object side to an observation side (eye-point side). The second lens L2 is a negative lens having a meniscus shape with a concave surface facing the object.

Figure 1:
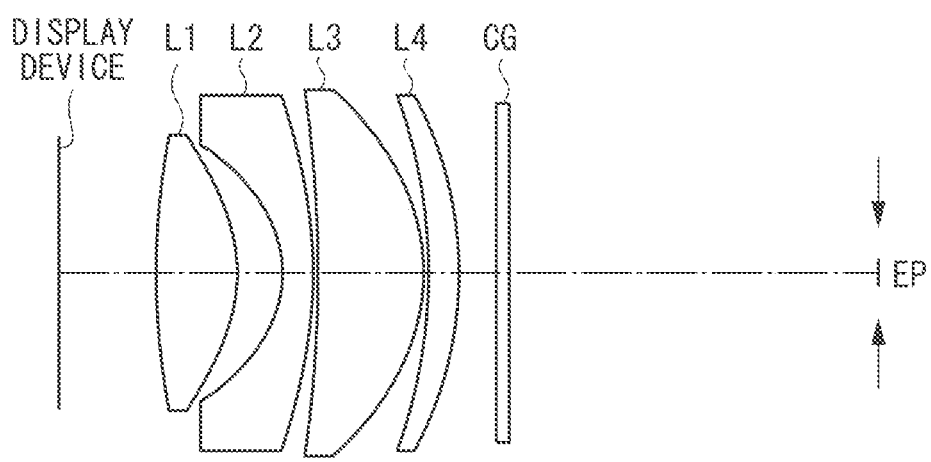
FIG. 1 is a cross-sectional view illustrating lenses of an ocular optical system according to a first exemplary embodiment of the present disclosure.
Figure 2:
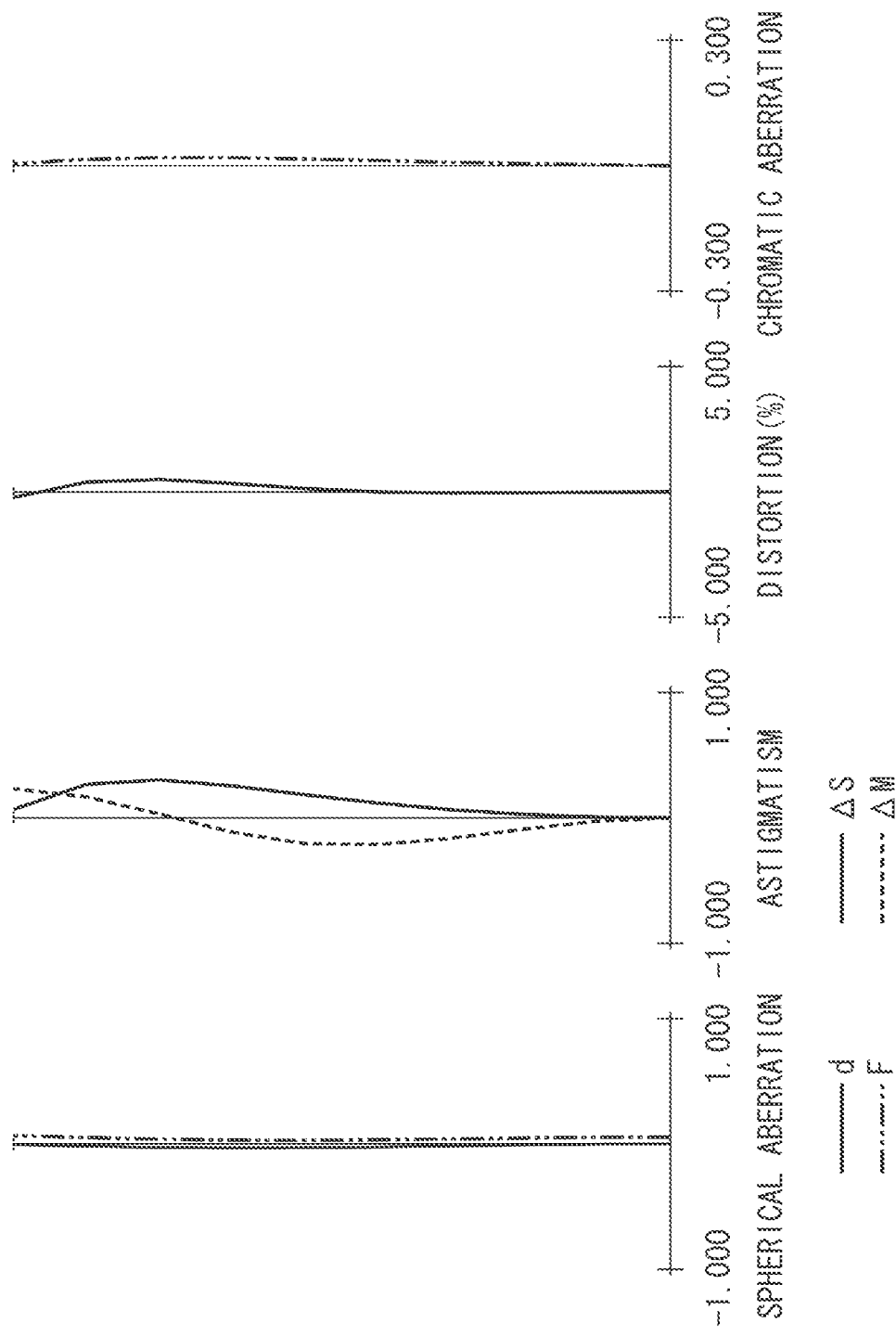
FIG. 2 is a diagram illustrating aberrations of the ocular optical system according to the first exemplary embodiment of the present disclosure.
Figure 3:
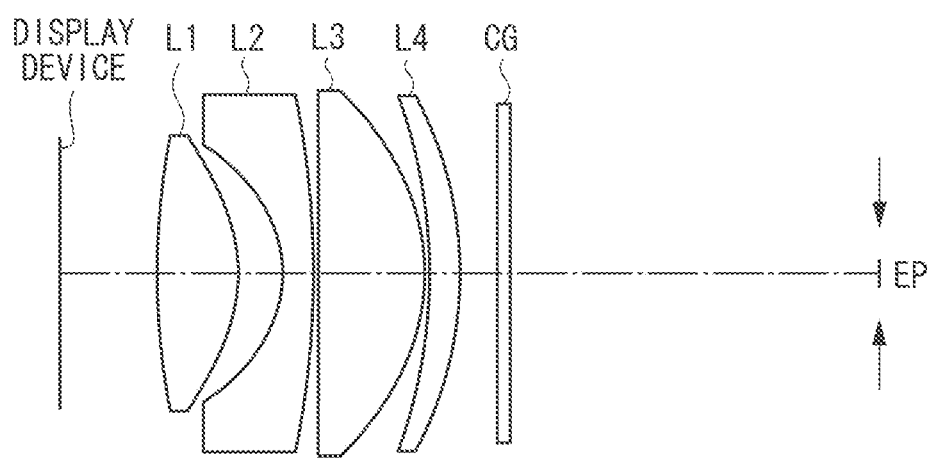
FIG. 3 is a cross-sectional view illustrating lenses of an ocular optical system according to a second exemplary embodiment of the present disclosure.
Figure 4:
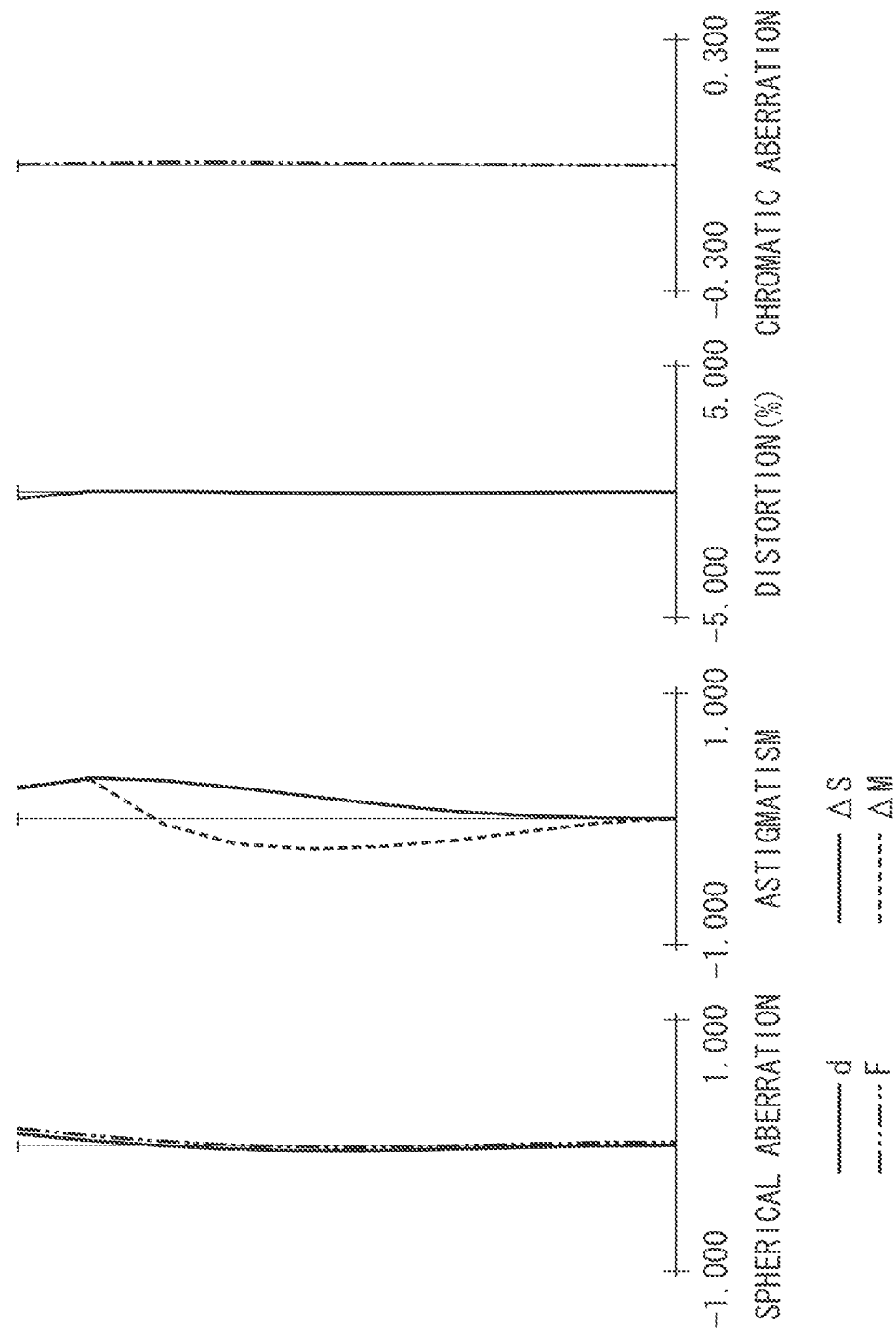
FIG. 4 is a diagram illustrating aberrations of the ocular optical system according to the second exemplary embodiment of the present disclosure.

FIG. 1 is a cross-sectional view illustrating lenses of an ocular optical system of a first exemplary embodiment at a dioptric power of −1 diopter (reference state). FIG. 2 is a diagram illustrating aberrations of the ocular optical system of the first exemplary embodiment in the reference state. FIG. 3 is a cross-sectional view illustrating lenses of an ocular optical system of a second exemplary embodiment at a dioptric power of −1 diopter (reference state). FIG. 4 is a diagram illustrating aberrations of the ocular optical system of the second exemplary embodiment in the reference state.

Figure 5:
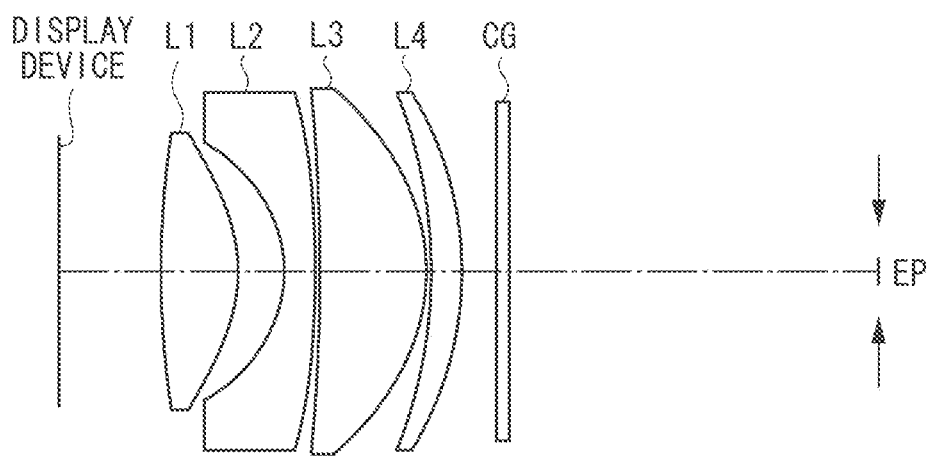
FIG. 5 is a cross-sectional view illustrating lenses of an ocular optical system according to a third exemplary embodiment of the present disclosure.
Figure 6:
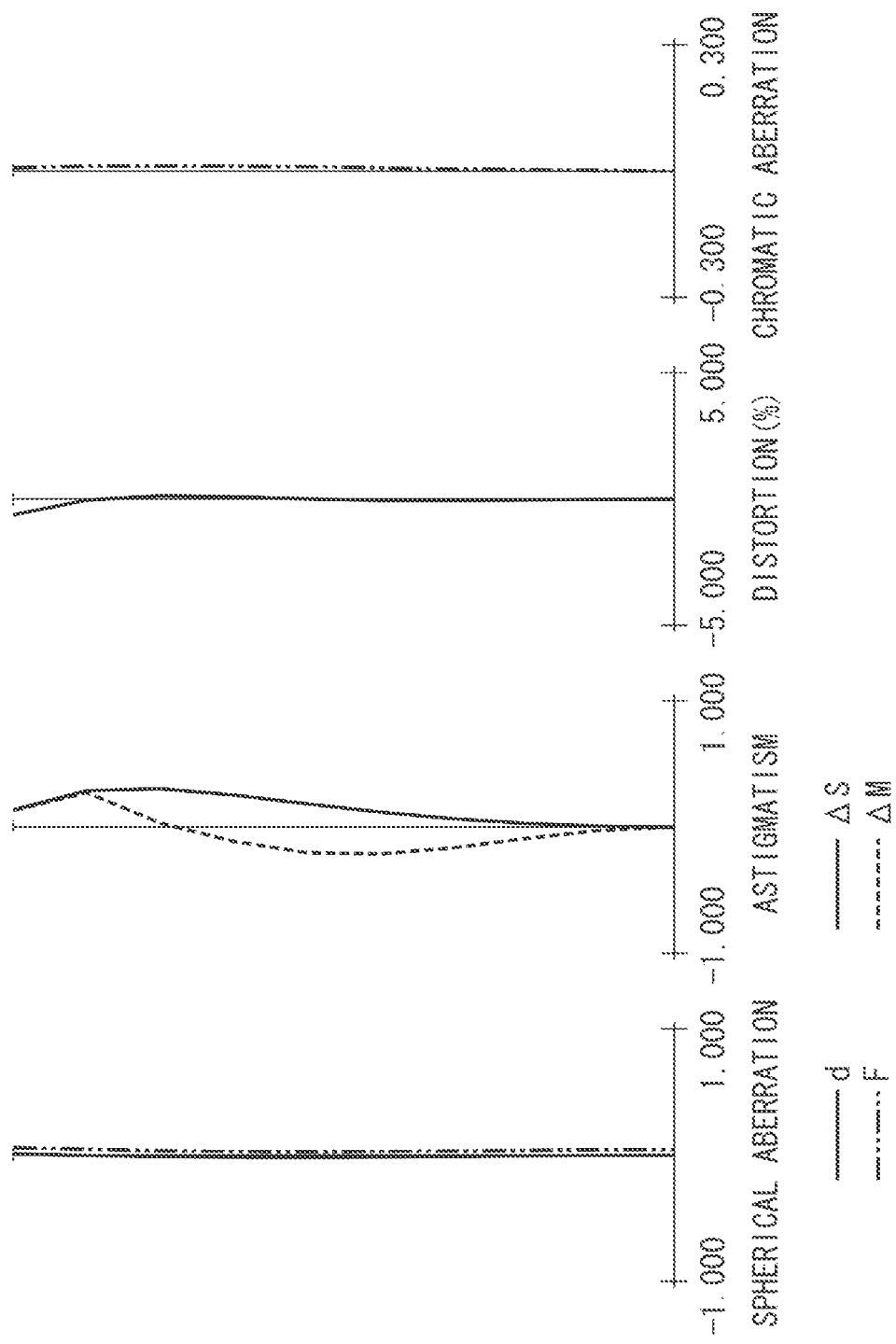
FIG. 6 is a diagram illustrating aberrations of the ocular optical system according to the third exemplary embodiment of the present disclosure.
Figure 7:
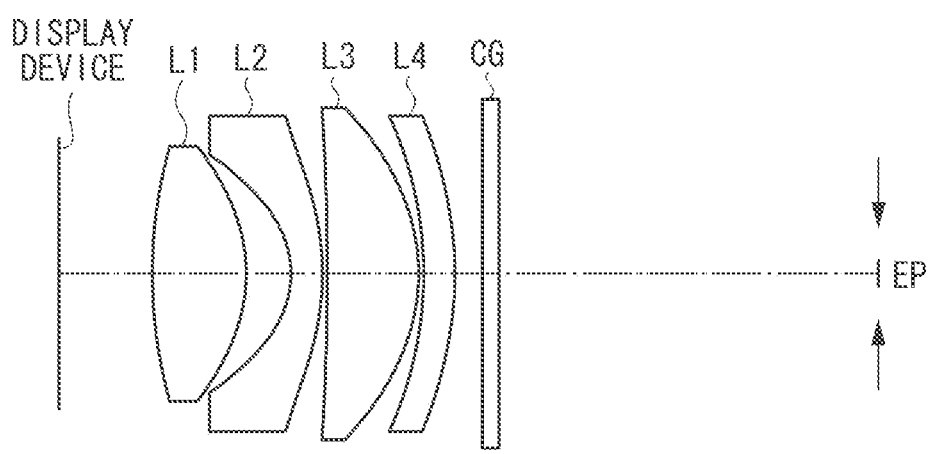
FIG. 7 is a cross-sectional view illustrating lenses of an ocular optical system according to a fourth exemplary embodiment of the present disclosure.
Figure 8:
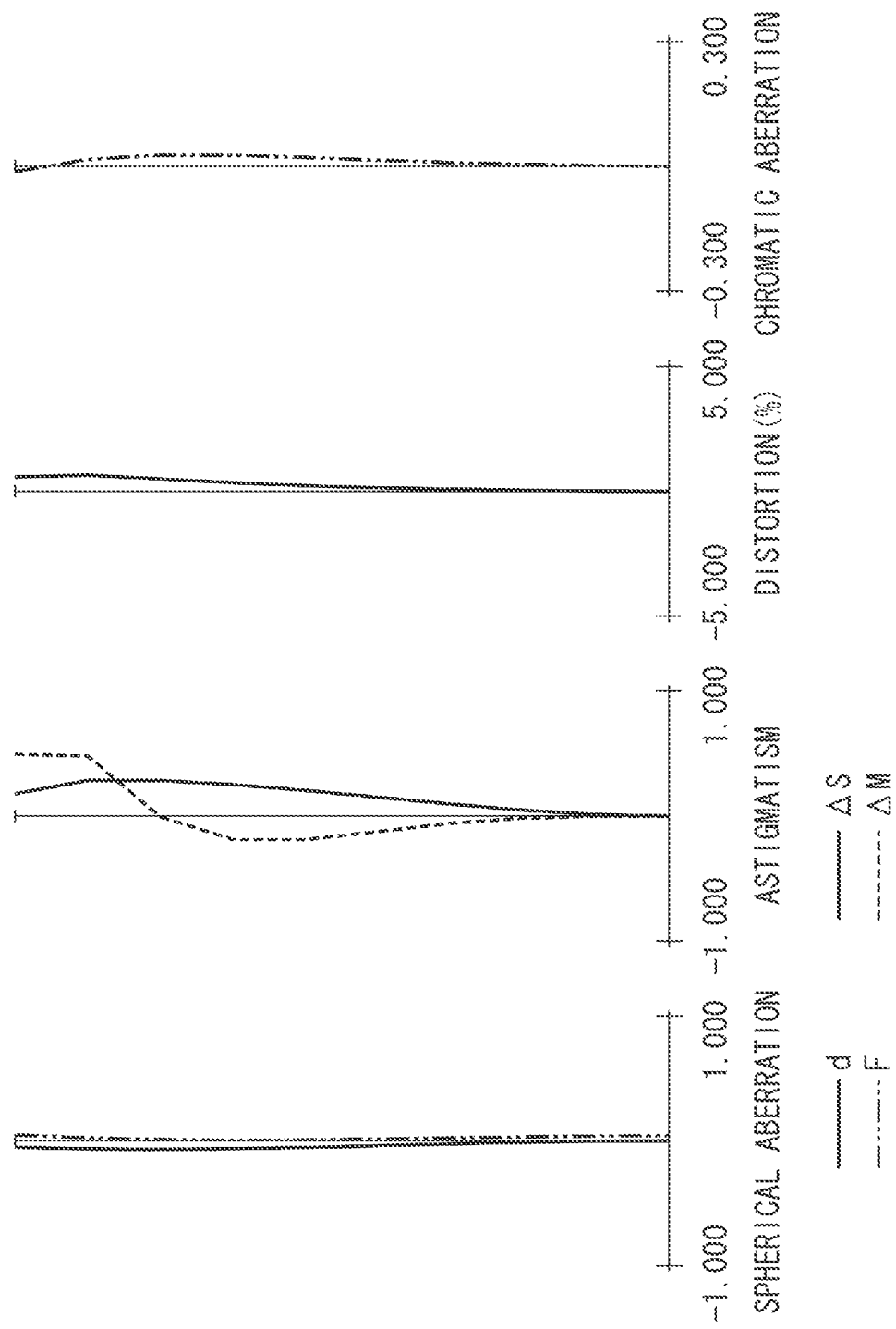
FIG. 8 is a diagram illustrating aberrations of the ocular optical system according to the fourth exemplary embodiment of the present disclosure.

FIG. 5 is a cross-sectional view illustrating lenses of an ocular optical system of a third exemplary embodiment at a dioptric power of −1 diopter (reference state). FIG. 6 is a diagram illustrating aberrations of the ocular optical system of the third exemplary embodiment in the reference state. FIG. 7 is a cross-sectional view illustrating lenses of an ocular optical system of a fourth exemplary embodiment at a dioptric power of −1 diopter (reference state). FIG. 8 is a diagram illustrating aberrations of the ocular optical system of the fourth exemplary embodiment in the reference state.

Figure 9:
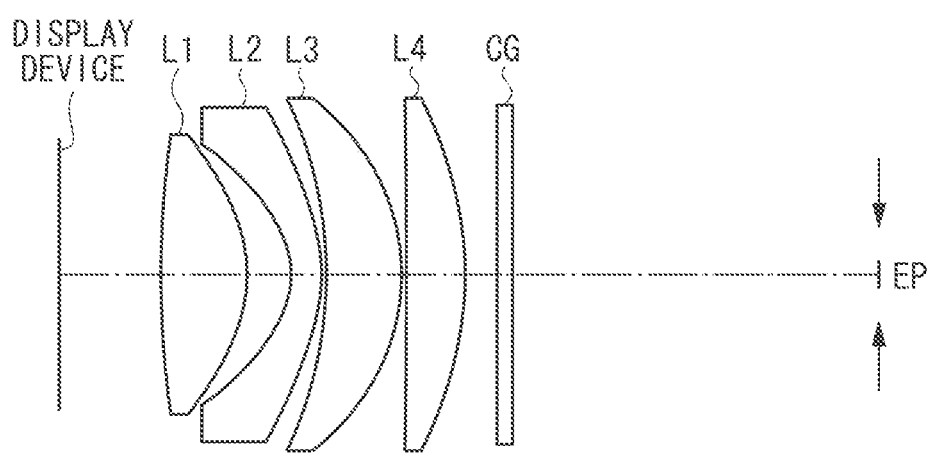
FIG. 9 is a cross-sectional view illustrating lenses of an ocular optical system according to a fifth exemplary embodiment of the present disclosure.
Figure 10:
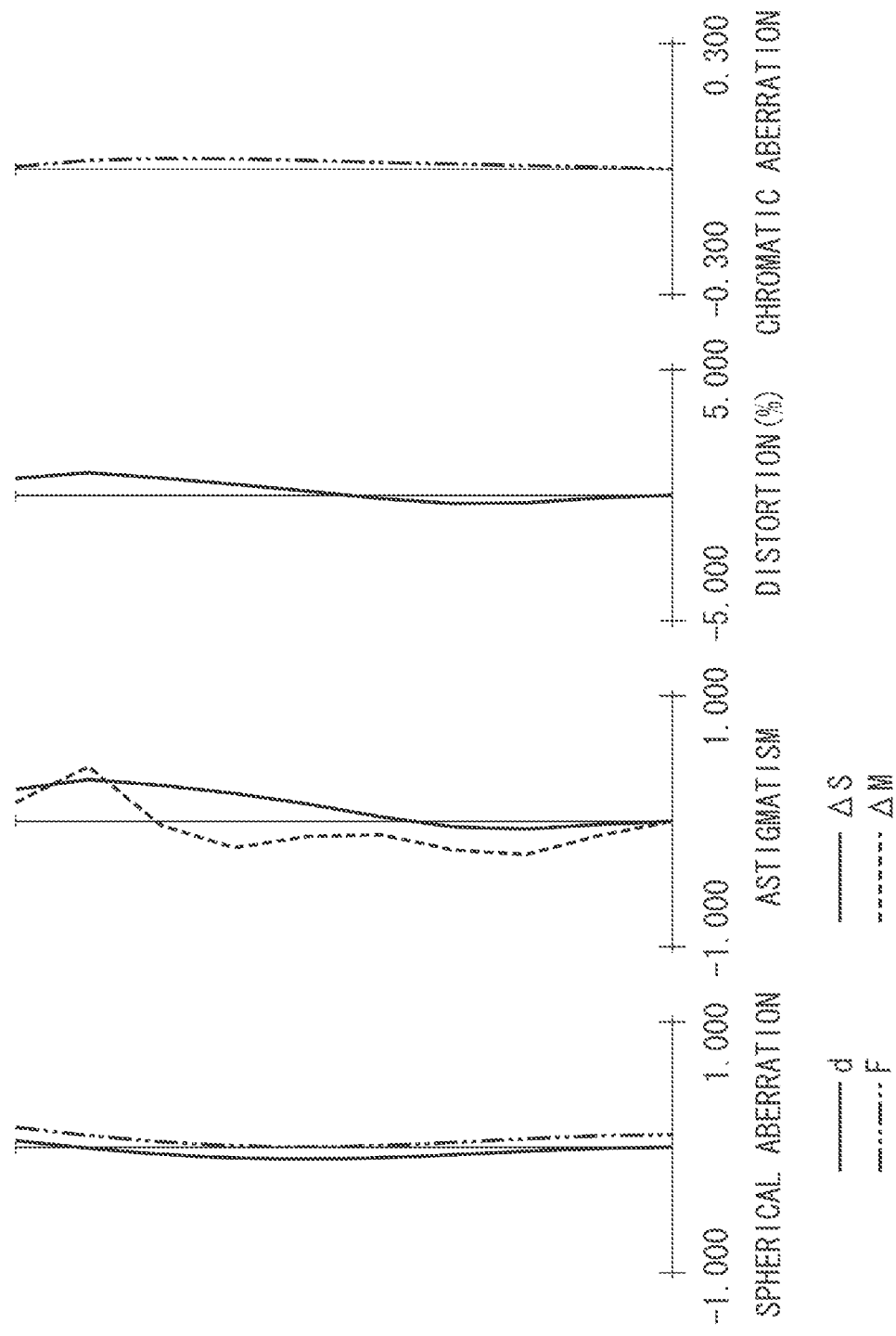
FIG. 10 is a diagram illustrating aberrations of the ocular optical system according to the fifth exemplary embodiment of the present disclosure.
Figure 11:
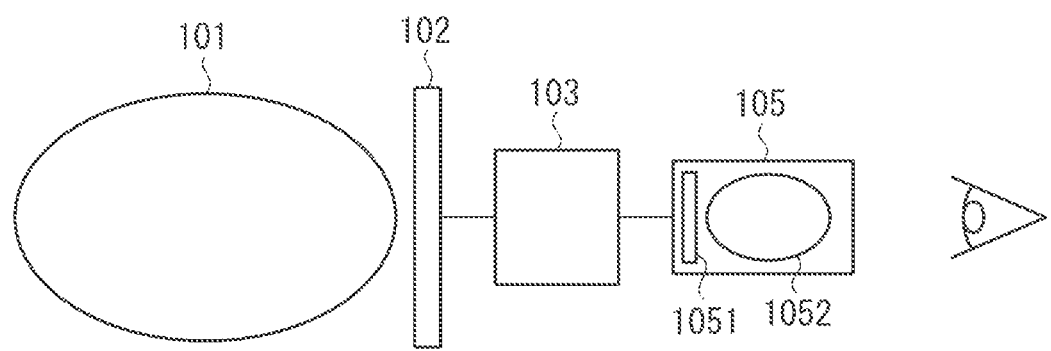
FIG. 11 schematically illustrates a main part of an imaging apparatus according to an exemplary embodiment of the present disclosure.

FIG. 9 is a cross-sectional view illustrating lenses of an ocular optical system of a fifth exemplary embodiment at a dioptric power of −1 diopter (reference state). FIG. 10 is a diagram illustrating aberrations of the ocular optical system of the fifth exemplary embodiment in the reference state. FIG. 11 schematically illustrates a main part of an imaging apparatus including the ocular optical system according to an exemplary embodiment of the present disclosure.

The ocular optical systems of the respective exemplary embodiments are used in, for example, electronic viewfinders of imaging apparatuses, such as digital cameras and video cameras. In each cross-sectional view illustrating lenses, the left side of the figure is the object side (or image display surface side), and the right side of the figure is the observation side (or eye-point side). A cover glass (CG) is a cover glass for protecting the ocular optical system. An eye-point EP is an eye-point from which the user observes images displayed on an image display device. The eye-point EP can be moved in the optical axis direction within a range that off-axis rays output from the image display device can pass through the pupil of the observer.

Each aberration diagram illustrates aberrations that occur in the ocular optical system of the corresponding exemplary embodiment when the dioptric power of the finder is −1 diopters (reference state). Each aberration diagram illustrates spherical aberration, astigmatism, distortion aberration, and chromatic aberration in this order from the left to right side of the figure.

The spherical aberration diagrams illustrate spherical aberrations with respect to a d-line (wavelength 587.6 nm) and an F-line (wavelength 486.1 nm). In the spherical aberration diagrams, a solid line illustrates spherical aberration with respect to the d-line and a double-dot dashed line illustrates spherical aberration with respect to the F-line. In the astigmatism diagrams, ΔS (solid line) and ΔM (dashed line) respectively indicate astigmatism on the sagittal image plane and the meridional image plane. The distortion aberration diagrams illustrate distortion aberrations with respect to the d-line. The chromatic aberration diagrams illustrate chromatic aberrations with respect to the F-line.

In an ocular optical system consisting only of a positive lens, on-axis chromatic aberrations and magnification chromatic aberrations occur frequently, and it is difficult to correct such aberrations. Thus, the ocular optical system of the present exemplary embodiment includes the negative lens in addition to the positive lenses.

Further, enlarging the angle of view leads to an increase in ocular lens diameter, and off-axis rays pass through a position located at a relatively large distance from the optical axis, so off-axis aberrations such as astigmatism and field curvature occur frequently. Thus, the shape of each lens of the ocular optical system of the present exemplary embodiment is set as appropriate so that the ocular optical system has an increased angle of view and off-axis aberrations such as astigmatism and field curvature of the ocular optical system are suitably corrected.

The ocular optical systems of the respective exemplary embodiments are characterized by satisfying the following conditional expressions:

$$1.00 < (R31 + R22)/(R31 - R22) < 4.50 \qquad (1), \text{ and}$$

$$1.00 < (R41 + R32)/(R41 - R32) < 4.50 \qquad (2).$$

In the conditional expressions, R22 is the curvature radius of the observation-side lens surface of the second lens L2, R31 is the curvature radius of the object-side lens surface of the third lens L3, R32 is the curvature radius of the observation-side lens surface of the third lens L3, and R41 is the curvature radius of the object-side lens surface of the fourth lens L4.

The conditional expression (1) is a conditional expression which defines the shape of a first air lens formed by the observation-side lens surface of the second lens L2 and the object-side lens surface of the third lens L3. The curvature radius R22 of the observation-side lens surface of the second lens L2 and the curvature radius R31 of the object-side lens surface of the third lens L3 are set as appropriate so that magnification chromatic aberrations are suitably corrected while the angle of view is enlarged.

If the lower limit value of the conditional expression (1) is exceeded, the shape of the object-side lens surface of the third lens L3 becomes convex, and off-axis rays cannot be raised sufficiently, so it becomes difficult to sufficiently enlarge the angle of view. Thus, exceeding the lower limit value of the conditional expression (1) is undesirable.

If the upper limit value of the conditional expression (1) is exceeded, the curvature radius of the observation-side lens surface of the second lens L2 and the curvature radius of the object-side lens surface of the third lens L3 become excessively close. In the ocular optical systems of the respective exemplary embodiments, magnification chromatic aberrations which occur at the observation-side lens surface of the second lens L2 are corrected as appropriate at the object-side lens surface of the third lens L3. If the curvature radius of the observation-side lens surface of the second lens L2 and the curvature radius of the object-side lens surface of the third lens L3 become excessively close, the correction balance of magnification chromatic aberrations is disrupted, and this makes it difficult to correct magnification chromatic aberrations as appropriate. Thus, exceeding the upper limit value of the conditional expression (1) is undesirable.

The conditional expression (2) is a conditional expression which defines the shape of a second air lens formed by the observation-side lens surface of the third lens L3 and the object-side lens surface of the fourth lens L4.

If the lower limit value of the conditional expression (2) is exceeded, the shape of the object-side lens surface of the fourth lens L4 becomes convex, and the ocular optical system is increased in size in the optical axis direction to prevent the third lens L3 and the fourth lens L4 from interfering each other. Thus, exceeding the lower limit value of the conditional expression (2) is undesirable.

If the upper limit value of the conditional expression (2) is exceeded, the curvature radius of the observation-side lens surface of the third lens L3 and the curvature radius of the object-side lens surface of the fourth lens L4 become excessively close. The curvature radius of the observation-side lens surface of the third lens L3 is often small to guide off-axis rays to the pupil of the observer. Thus, if the upper limit value of the conditional expression (2) is exceeded, the curvature radius of the object-side lens surface of the fourth lens L4 also becomes small, and off-axis aberrations such as field curvature occur frequently. Thus, exceeding the upper limit value of the conditional expression (2) is undesirable.

In the ocular optical systems of the respective exemplary embodiments, the shape of each lens is set as appropriate to satisfy the conditional expressions (1) and (2) so that the ocular optical systems are acquired with a wide angle of view and high optical performance.

In the respective exemplary embodiments, the numerical ranges of the conditional expressions (1) and (2) are desirably set as follows:

$$1.01<(R31+R22)/(R31-R22)<4.30 \quad (1a), \text{ and}$$

$$1.01<(R41+R32)/(R41-R32)<4.00 \quad (2a).$$

More desirably, the numerical ranges of the conditional expressions (1) and (2) are set as follows:

$$1.01<(R31+R22)/(R31-R22)<4.20 \quad (1b), \text{ and}$$

$$1.02<(R41+R32)/(R41-R32)<3.50 \quad (2b).$$

Further, it is more desirable to satisfy one or more of the following conditional expressions in the respective exemplary embodiments:

$$-1.25<f1/f2<-0.50 \quad (3),$$

$$-1.00<(R12+R11)/(R12-R11)<-0.40 \quad (4),$$

$$1.60<Nd2<2.10 \quad (5), \text{ and}$$

$$5.00<vd2<23.00 \quad (6).$$

In the conditional expressions, f1 is the focal length of the first lens L1, and f2 is the focal length of the second lens L2. Further, R11 is the curvature radius of the object-side lens surface of the first lens L1, R12 is the curvature radius of the observation-side lens surface of the first lens L1, Nd2 is the refractive index of the material of the second lens L2, and vd2 is the Abbe number.

Further, Nd2 indicates the refractive index of the material with respect to the d-line (587.6 nm). The Abbe number vd is expressed as follows:

$$vd=(Nd-1)/(NF-NC),$$

where NF is the refractive index of the material with respect to the F-line (486.1 nm), and NC is the refractive index of the material with respect to the C-line (656.3 nm).

The conditional expression (3) is a conditional expression which defines the ratio between the focal length f1 of the first lens L1 and the focal length f2 of the second lens L2. If the lower limit value of the conditional expression (3) is exceeded and the focal length f2 of the second lens L2 becomes short, the refractive power of the second lens L2 becomes excessively strong. As a result, many off-axis aberrations, such as field curvature, occur. Thus, exceeding the lower limit value of the conditional expression (3) is undesirable. If the upper limit value of the conditional expression (3) is exceeded and the focal length f2 of the second lens L2 becomes long, the refractive power of the second lens L2 becomes excessively weak. As a result, it becomes difficult to sufficiently correct chromatic aberrations. Thus, exceeding the upper limit value of conditional expression (3) is undesirable.

The conditional expression (4) is a conditional expression which defines the shape of the first lens L1. The curvature radius of the lens surface of the first lens L1 on the object side is set relatively long to reduce occurrence of off-axis aberrations, such as field curvature. Further, the observation-side curvature radius of the observation-side lens surface of the first lens L1 is set relatively short to effectively correct chromatic aberrations.

If the lower limit value of the conditional expression (4) is exceeded, the curvature radius of the object-side lens surface of the first lens L1 and the curvature radius of the observation-side lens surface of the first lens L1 become excessively close, and this makes it difficult to reduce off-axis aberrations while correcting chromatic aberrations. Thus, exceeding the lower limit value of the conditional expression (4) is undesirable. If the upper limit value of the conditional expression (4) is exceeded, the curvature radius of the object-side lens surface of the first lens L1 becomes excessively short. As a result, off-axis aberrations occur frequently at the first lens L1, so exceeding the upper limit value of the conditional expression (4) is undesirable.

The conditional expression (5) is a conditional expression which defines the refractive index Nd2 of the material of the second lens L2. If the lower limit value of the conditional expression (5) is exceeded and the refractive index Nd2 decreases, the negative refractive power of the second lens L2 becomes excessively weak, and this makes it difficult to sufficiently correct chromatic aberrations. Thus, exceeding the lower limit value of the conditional expression (5) is undesirable. If the upper limit value of the conditional expression (5) is exceeded and the refractive index Nd2 increases, the chromatic aberration correction balance of the entire ocular optical system is likely to be disrupted. Thus, exceeding the upper limit value of the conditional expression (5) is undesirable.

The conditional expression (6) is a conditional expression which defines the Abbe number vd2 of the material of the second lens L2. If the lower limit value of conditional expression (6) is exceeded and the Abbe number vd2 decreases, the chromatic aberration correction balance of the entire ocular optical system is likely to be disrupted. Thus, exceeding the lower limit value of the conditional expression (6) is undesirable. If the upper limit value of the conditional expression (6) is exceeded and the Abbe number vd2 increases, it becomes difficult to sufficiently correct chromatic aberrations in the entire ocular optical system. Thus, exceeding the upper limit value of the conditional expression (6) is undesirable.

Further, the material of the second lens L2 is desirably a resin material. Use of especially a high-dispersion resin material makes it possible to suitably correct chromatic aberrations.

In the respective exemplary embodiments, the numerical ranges of the conditional expressions (3) to (6) are desirably set as follows:

$$-1.23<f1/f2<-0.60 \quad (3a),$$

$$-0.90<(R12+R11)/(R12-R11)<-0.43 \quad (4a),$$

$$1.62<Nd2<2.00 \quad (5a), \text{ and}$$

$$10.00<vd2<22.70 \quad (6a).$$

More desirably, the numerical ranges of the conditional expressions (3) to (6) are set as follows:

$$-1.21 < f1/f2 < -0.70 \quad (3b),$$

$$-0.80 < (R12+R11)/(R12-R11) < -0.46 \quad (4b),$$

$$1.63 < Nd2 < 1.80 \quad (5b), \text{ and}$$

$$12.00 < vd2 < 22.50 \quad (6b).$$

In a case of using the ocular optical systems of the respective exemplary embodiments in an observation apparatus for observing images displayed on the image display surface, the following conditional expression is desirably satisfied:

$$0.25 < H/f < 0.55 \quad (7).$$

In the conditional expression (7), H is a half of the diagonal length of the image display surface and f is a focal length of the ocular optical system.

If the upper limit value of the conditional expression (7) is exceeded and the image display surface becomes excessively large, the height of rays incident on the first lens L1 becomes high, and the effective diameter of the first lens L1 increases. Thus, exceeding the upper limit value of conditional expression (7) is undesirable. If the lower limit value of the conditional expression (7) is exceeded and the image display surface becomes excessively small, the enlargement magnification of the ocular optical system needs to be increased to project images in large size. If the refractive power of the entire ocular optical system is increased to increase the enlargement magnification of the ocular optical system, it becomes difficult to suitably correct such aberrations. Thus, exceeding the lower limit value of the conditional expression (7) is undesirable.

In the respective exemplary embodiments, the numerical range of the conditional expression (7) is desirably set as follows $$0.28 < H/f < 0.50 \quad (7a).$$

More desirably, the numerical range of the conditional expression (7) is set as follows:

$$0.31 < H/f < 0.45 \quad (7b).$$

Next, first to fifth numerical examples respectively corresponding to the first to fifth exemplary embodiments of the present disclosure will be described below. In the respective numerical examples, i indicates the order of an optical plane from the image display surface side. Further, ri is the curvature radius of the optical surface at the i-th optical plane (i-th plane), di is the interval between the i-th plane and the i+1-th plane, ndi is the refractive index of the material of the i-th optical member with respect to the d-line, and vdi is the Abbe number of the material of the i-th optical member with respect to the d-line. Further, since the image display surface is the object plane the ocular optical system, r1 is the image display surface. The closest plane to the observation side is the eye-point EP in the ocular optical systems of the respective exemplary embodiment in the reference state.

Further, when a given optical surface is an aspherical surface, the aspherical shape thereof is expressed as follows:

$$x = (h^2/R)/[1+[1-(1+K)(h/R)^2]^{1/2}] + A4h^4 + A6h^6 + A8h^8 + A10h^{10},$$

where K is the eccentricity, A4, A6, A8, and A10 are aspherical coefficients, x is a displacement in the optical axis direction at a position of the height h from the optical axis based on the surface apex, and R is the paraxial curvature radius. The surface plane with an asterisk mark ("*") to the right side of the surface plane number indicates a plane of an aspherical surface. Further, the term "E-Z" indicates "$10^{-Z}$".

The focal length of the ocular optical system of the first exemplary embodiment is 18.71 mm. The diagonal length of the image display surface of the finder including the ocular optical system of the first exemplary embodiment is 2H=12.70 mm, and the angle of view is 2ω=36.99 degrees. The focal length of the ocular optical system of the second exemplary embodiment is 18.71 mm. The diagonal length of the image display surface of the finder including the ocular optical system of the second exemplary embodiment is 2H=12.70 mm, and the angle of view is 2ω=36.99 degrees. The focal length of the ocular optical system of the third exemplary embodiment is 18.71 mm. The diagonal length of the image display surface of the finder including the ocular optical system of the third exemplary embodiment is 2H=12.70 mm, and the angle of view is 2ω=36.87 degrees.

The focal length of the ocular optical system of the fourth exemplary embodiment is 17.30 mm. The diagonal length of the image display surface of the finder including the ocular optical system of the fourth exemplary embodiment is 2H=10.20 mm, and the angle of view is 2ω=32.59 degrees. The focal length of the ocular optical system of the fifth exemplary embodiment is 19.17 mm. The diagonal length of the image display surface of the finder including the ocular optical system of the fifth exemplary embodiment is 2H=12.70 mm, and the angle of view is 2ω=36.47 degrees.

First Example

Unit mm
Plane Data

TABLE 1

| Plane Number | ri | di | ndi | vdi |
|---|---|---|---|---|
| 1 | ∞ | variable | | |
| 2 | 46.05 | 5.06 | 1.53 | 56.00 |
| 3* | −10.01 | 2.83 | | |
| 4* | −7.04 | 1.90 | 1.65 | 21.50 |
| 5* | −27.18 | 0.30 | | |
| 6 | −79.98 | 6.60 | 1.77 | 49.24 |
| 7* | −12.61 | 0.30 | | |
| 8 | −32.47 | 1.90 | 1.53 | 56.00 |
| 9* | −23.59 | variable | | |
| 10 | ∞ | 0.80 | 1.52 | 64.14 |
| 11 | ∞ | 23.00 | | |
| 12 (EP) | | | | |

TABLE 2

| Aspherical Data | | | | | |
|---|---|---|---|---|---|
| | K | A4 | A6 | A8 | A10 |
| 3* | −1.46E−01 | 2.72E−04 | −1.74E−06 | 2.19E−08 | 0.00 |
| 4* | −1.09 | 2.56E−05 | −4.45E−06 | 5.09E−08 | −4.42E−10 |

TABLE 2-continued

Aspherical Data

| | K | A4 | A6 | A8 | A10 |
|---|---|---|---|---|---|
| 5* | −4.63E−01 | 3.89E−05 | −1.72E−07 | 3.12E−10 | 0.00 |
| 7* | −2.08 | −8.73E−05 | 2.69E−07 | −1.94E−09 | 4.42E−12 |
| 9* | −9.76 | −7.63E−05 | 1.44E−07 | 6.50E−10 | −3.70E−12 |

TABLE 3

| | Dioptric Power [diopter] | | |
|---|---|---|---|
| | −1.00 | −4.00 | +2.00 |
| d1 | 6.47 | 5.34 | 7.52 |
| d9 | 2.33 | 3.46 | 1.28 |

TABLE 4

| Focal Length f | Diagonal Length of Image Display Surface 2H | Angle of View 2ω [°] |
|---|---|---|
| 18.71 | 12.70 | 36.99 |

Second Example

Unit mm
Plane Data

TABLE 5

| Plane Number | ri | di | ndi | vdi |
|---|---|---|---|---|
| 1 | ∞ | variable | | |
| 2 | 51.73 | 4.82 | 1.53 | 56.00 |
| 3* | −10.26 | 2.79 | | |
| 4* | −7.51 | 1.90 | 1.64 | 22.40 |
| 5 | −55.66 | 0.30 | | |
| 6 | −5000.00 | 6.60 | 1.77 | 49.24 |
| 7* | −13.58 | 0.30 | | |
| 8 | −33.79 | 1.90 | 1.53 | 56.00 |
| 9* | −20.98 | variable | | |
| 10 | ∞ | 0.80 | 1.52 | 64.14 |
| 11 | ∞ | 23.00 | | |
| 12 (EP) | | | | |

TABLE 6

Aspherical Data

| | K | A4 | A6 | A8 | A10 |
|---|---|---|---|---|---|
| 3* | −3.08E−01 | 2.46E−04 | −1.12E−06 | 8.74E−09 | 0.00 |
| 4* | −1.22 | −3.36E−05 | −4.15E−06 | 4.17E−08 | −3.68E−10 |
| 7* | −1.11 | −4.52E−05 | 2.82E−07 | −2.32E−09 | 6.40E−12 |
| 9* | −9.70 | −7.25E−05 | 1.13E−07 | 1.07E−09 | −5.01E−12 |

TABLE 7

| Dioptric Power [diopter] | −1.00 | −4.00 | +2.00 |
|---|---|---|---|
| d1 | 6.53 | 5.39 | 7.57 |
| d9 | 2.20 | 3.34 | 1.16 |

TABLE 8

| Focal Length f | Diagonal Length of Image Display Surface 2H | Angle of View 2ω [°] |
|---|---|---|
| 18.71 | 12.70 | 36.99 |

Third Example

Unit mm
Plane Data

TABLE 9

| Plane Number | ri | di | ndi | vdi |
|---|---|---|---|---|
| 1 | ∞ | variable | | |
| 2 | 57.49 | 4.78 | 1.53 | 56.00 |
| 3* | −9.73 | 2.86 | | |
| 4* | −7.92 | 1.90 | 1.64 | 22.40 |
| 5* | −72.54 | 0.30 | | |
| 6 | −118.72 | 6.60 | 1.77 | 49.24 |
| 7* | −12.57 | 0.30 | | |
| 8 | −29.83 | 1.90 | 1.53 | 56.00 |
| 9* | −20.98 | variable | | |
| 10 | ∞ | 0.80 | 1.52 | 64.14 |
| 11 | ∞ | 23.00 | | |
| 12 (EP) | | | | |

TABLE 10

| | Aspherical Data | | | | |
|---|---|---|---|---|---|
| | K | A4 | A6 | A8 | A10 |
| 3* | −2.83E−01 | 2.86E−04 | −1.29E−06 | 1.48E−08 | 0.00 |
| 4* | −9.59E−01 | 9.49E−06 | −4.06E−06 | 3.96E−08 | −4.85E−10 |
| 5* | −1.77E+01 | −2.23E−05 | −3.56E−08 | 6.28E−10 | −9.00E−13 |
| 7* | −1.15 | −4.77E−05 | 2.14E−07 | −2.47E−09 | 7.25E−12 |
| 9* | −7.63 | −8.15E−05 | 1.17E−07 | 1.08E−09 | −5.31E−12 |

TABLE 11

| Dioptric Power [diopter] | −1.00 | −4.00 | +2.00 |
|---|---|---|---|
| d1 | 6.51 | 5.38 | 7.55 |
| d9 | 2.14 | 3.27 | 1.10 |

TABLE 12

| Focal Length f | Diagonal Length of Image Display Surface 2H | Angle of View 2ω [°] |
|---|---|---|
| 18.71 | 12.70 | 36.87 |

Fourth Example

Unit mm
Plane Data

TABLE 13

| Plane Number | ri | di | ndi | vdi |
|---|---|---|---|---|
| 1 | ∞ | variable | | |
| 2 | 28.73 | 5.70 | 1.53 | 56.00 |
| 3* | −9.88 | 2.71 | | |
| 4* | −5.89 | 1.90 | 1.65 | 21.50 |
| 5* | −17.69 | 0.30 | | |
| 6 | −160.60 | 5.54 | 1.77 | 49.50 |
| 7* | −12.00 | 0.30 | | |
| 8 | −23.08 | 1.90 | 1.53 | 56.00 |
| 9* | −20.98 | variable | | |
| 10 | ∞ | 0.80 | 1.52 | 64.14 |
| 11 | ∞ | 23.00 | | |
| 12 (EP) | | | | |

TABLE 14

| | Aspherical Data | | | | |
|---|---|---|---|---|---|
| | K | A4 | A6 | A8 | A10 |
| 3* | −8.06E−01 | 1.08E−04 | −2.34E−06 | 2.37E−08 | 0.00 |
| 4* | −1.57 | −5.88E−04 | 1.48E−06 | 7.32E−08 | −7.91E−10 |
| 5* | 2.56E−01 | −9.64E−05 | 3.34E−06 | −1.57E−08 | 0.00 |
| 7* | −1.11 | −3.32E−05 | 2.93E−07 | −4.38E−09 | 1.83E−11 |
| 9* | −4.62 | 1.87E−05 | −5.96E−07 | 3.93E−09 | −1.28E−11 |

TABLE 15

| Dioptric Power [diopter] | −1.00 | −4.00 | +2.00 |
|---|---|---|---|
| d1 | 5.94 | 4.97 | 6.83 |
| d9 | 1.67 | 2.64 | 0.78 |

TABLE 16

| Focal Length f | Diagonal Length of Image Display Surface 2H | Angle of View 2ω [°] |
|---|---|---|
| 17.30 | 10.20 | 32.59 |

Fifth Example

Unit mm
Plane Data

TABLE 17

| Plane Number | ri | di | ndi | vdi |
|---|---|---|---|---|
| 1 | ∞ | variable | | |
| 2 | 62.09 | 5.41 | 1.53 | 56.00 |
| 3* | −9.10 | 2.77 | | |
| 4* | −5.22 | 1.90 | 1.66 | 20.40 |
| 5* | −10.22 | 0.30 | | |
| 6 | −26.08 | 4.72 | 1.53 | 56.00 |
| 7* | −13.69 | 0.30 | | |
| 8 | −811.15 | 3.69 | 1.53 | 56.00 |
| 9* | −20.98 | variable | | |
| 10 | ∞ | 0.80 | 1.52 | 64.14 |
| 11 | ∞ | 23.00 | | |
| 12 (EP) | | | | |

TABLE 18

| | Aspherical Data | | | | |
|---|---|---|---|---|---|
| | K | A4 | A6 | A8 | A10 |
| 3* | −7.50E−01 | 2.26E−04 | −2.10E−06 | 1.26E−08 | 0.00 |
| 4* | −1.90 | −4.60E−05 | −5.15E−06 | 6.32E−08 | −3.79E−10 |
| 5* | −5.70 | −2.81E−05 | 2.17E−09 | 0.00 | 0.00 |
| 7* | −6.39E−01 | −5.80E−05 | 2.77E−07 | −2.15E−09 | 1.68E−12 |
| 9* | −7.05 | −3.51E−05 | −1.50E−07 | 1.94E−09 | −6.31E−12 |

TABLE 19

| Dioptric Power [diopter] | −1.00 | −4.00 | +2.00 |
|---|---|---|---|
| d1 | 6.72 | 5.54 | 7.81 |
| d9 | 1.99 | 3.17 | 0.90 |

TABLE 20

| Focal Length f | Diagonal Length of Image Display Surface 2H | Angle of View 2ω [°] |
|---|---|---|
| 19.71 | 12.70 | 36.47 |

Next, Table 21 shows a summary of the numerical values of the above-described conditional expressions in the respective numerical examples.

TABLE 21

| | Conditional Expression (1) | Conditional Expression (2) | Conditional Expression (3) | Conditional Expression (4) | Conditional Expression (5) | Conditional Expression (6) | Conditional Expression (7) |
|---|---|---|---|---|---|---|---|
| First Example | 2.03 | 2.27 | −1.05 | −0.64 | 1.65 | 21.50 | 0.34 |
| Second Example | 1.02 | 2.34 | −1.20 | −0.67 | 1.64 | 22.40 | 0.34 |
| Third Example | 4.14 | 2.46 | −1.14 | −0.71 | 1.64 | 22.40 | 0.34 |
| Fourth Example | 1.25 | 3.17 | −1.00 | −0.49 | 1.65 | 21.50 | 0.29 |
| Fifth Example | 2.29 | 1.03 | −0.80 | −0.74 | 1.66 | 20.40 | 0.33 |

Next, an imaging apparatus according to an exemplary embodiment using the ocular optical systems of the respective exemplary embodiments will be described below with reference to FIG. 11. An object image formed by an imaging optical system 101 is converted into an electric signal by an image sensor 102 which is photoelectric conversion device. Examples of an image sensor used as the image sensor 102 include a charge-coupled device (CCD) sensor and a complementary metal-oxide semiconductor (CMOS) sensor.

An output signal from the image sensor 102 is processed by an image processing circuit 103 to generate image data. The image data is recorded on a non-illustrated recording medium, such as a semiconductor memory, a magnetic tape, or an optical disk. A finder unit 105 includes an image display device 1051 and an ocular optical system 1052 according to any one of the exemplary embodiments described above. The image display device 1051 includes a liquid crystal display device and displays images based on the image data generated at the image processing circuit 103.

Application of the ocular optical systems of the exemplary embodiments of the present disclosure to imaging apparatuses, such as digital cameras or video cameras, makes it possible to acquire imaging apparatuses with a wide angle of view and high optical performance.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-090590, filed Apr. 28, 2017, which is hereby incorporated by reference herein in its entirety.

What is claimed is:

1. An ocular optical system comprising:
   a first lens having positive refractive power,
   a second lens having negative refractive power,
   a third lens having positive refractive power, and
   a fourth lens having positive refractive power,
   the first, second, third, and fourth lenses arranged in this order from an object side to an observation side of the ocular optical system,
   wherein the second lens has a meniscus shape with a concave surface facing the object side, a sign of a paraxial curvature radius of an observation-side lens surface of the second lens and a sign of a paraxial curvature radius of an object-side lens surface of the second lens being same,
   wherein the third lens has a meniscus shape with a concave surface facing the object side,
   wherein a thickness of the third lens on an optical axis is greater than a thickness of the fourth lens on the optical axis, and
   wherein the following conditional expressions are satisfied:

$$1.00 < (R41 + R32)/(R41 - R32) < 4.50$$

$$-0.80 < (R12 + R11)/(R12 - R11) < -0.40 \text{ and}$$

$$-1.25 \leq f1/f2 \leq -0.80,$$

where R32 is a paraxial curvature radius of an observation-side lens surface of the third lens, R41 is a paraxial curvature radius of an object-side lens surface of the fourth lens, R11 is a paraxial curvature radius of an object-side lens surface of the first lens, R12 is a paraxial curvature radius of an observation-side lens surface of the first lens, f1 is a focal length of the first lens, and f2 is a focal length of the second lens.

2. The ocular optical system according to claim 1, wherein the following conditional expression is satisfied:

$1.60<Nd2<2.10$ where Nd2 is a refractive index of a material of the second lens with respect to a d-line.

3. The ocular optical system according to claim 1, wherein the second lens is made of a resin material.

4. The ocular optical system according to claim 1, wherein the ocular optical system consists of the first lens, the second lens, the third lens, and the fourth lens arranged in this order from the object side to the observation side.

5. The ocular optical system according to claim 1, wherein the first lens has biconvex shape.

6. The ocular optical system according to claim 1, wherein the fourth lens has a meniscus shape with a concave surface facing the object side.

7. The ocular optical system according to claim 1, wherein the following conditional expression is satisfied:

$-0.74 \leq (R12+R11)/(R12-R11) < -0.40$.

8. The ocular optical system according to claim 1, wherein the following conditional expression is satisfied:

$-0.71 \leq (R12+R11)/(R12-R11) < -0.40$.

9. The ocular optical system according to claim 1, wherein the following conditional expression is satisfied:

$-0.67 \leq (R12+R11)/(R12-R11) < -0.40$.

10. An observation apparatus comprising:
an image display device; and
an ocular optical system used for observing an image displayed on an image display surface of the image display device,
wherein the ocular optical system comprising:
  a first lens having positive refractive power,
  a second lens having negative refractive power,
  a third lens having positive refractive power, and
  a fourth lens having positive refractive power,
  the first, second, third, and fourth lenses arranged in this order from an object side to an observation side of the ocular optical system,
wherein the second lens has a meniscus shape with a concave surface facing the object side, a sign of a paraxial curvature radius of an observation-side lens surface of the second lens and a sign of a paraxial curvature radius of an object-side lens surface of the second lens being same,
wherein the third lens has a meniscus shape with a concave surface facing the object side,
wherein a thickness of the third lens on an optical axis is greater than a thickness of the fourth lens on the optical axis, and
wherein the following conditional expressions are satisfied:

$1.00<(R41+R32)/(R41-R32)<4.50$, $-0.80<(R12+R11)/(R12-R11)<-0.40$, and $-1.25<f1/f2 \leq -0.80$, where R32 is a paraxial curvature radius of an observation-side lens surface of the third lens, R41 is a paraxial curvature radius of an object-side lens surface of the fourth lens, R11 is a paraxial curvature radius of an object-side lens surface of the first lens, R12 is a paraxial curvature radius of an observation-side lens surface of the first lens, f1 is a focal length of the first lens, and f2 is a focal length of the second lens.

11. The observation apparatus according to claim 10, wherein the following a conditional expression is satisfied:

$0.25<H/f<0.55$ where H is a half of a diagonal length of the image display surface and f is a focal length of the ocular optical system.

12. An imaging apparatus comprising:
an image sensor;
an imaging optical system configured to form an object image on the image sensor;
an image display device configured to display the object image; and
an ocular optical system which is used to observe an image displayed on the image display device,
wherein the ocular optical system includes:
a first lens having positive refractive power,
a second lens having negative refractive power,
a third lens having positive refractive power, and
a fourth lens having positive refractive power,
wherein the first, second, third, and fourth lenses arranged in this order from an object side to an observation side,
wherein the second lens has a meniscus shape with a concave surface facing the object side, a sign of a paraxial curvature radius of an observation-side lens surface of the second lens and a sign of a paraxial curvature radius of an object-side lens surface of the second lens being same,
wherein the third lens has a meniscus shape with a concave surface facing the object side,
wherein a thickness of the third lens on an optical axis is greater than a thickness of the fourth lens on the optical axis, and
wherein the following conditional expressions are satisfied:

$1.00<(R41+R32)/(R41-R32)<4.50$, $-0.80<(R12+R11)/(R12-R11)<-0.40$, and $-1.25<f1/f2 \leq -0.80$, where R32 is a paraxial curvature radius of an observation-side lens surface of the third lens, R41 is a paraxial curvature radius of an object-side lens surface of the fourth lens, R11 is a paraxial curvature radius of an object-side lens surface of the first lens, R12 is a paraxial curvature radius of an observation-side lens surface of the first lens, f1 is a focal length of the first lens, and f2 is a focal length of the second lens.

* * * * *